United States Patent [19]

Nunn, Jr.

[11] 3,901,342

[45] Aug. 26, 1975

[54] HYDRAULIC POWER BRAKE SYSTEM INCORPORATING AUXILIARY MEANS FOR DRIVING THE PUMP THEREOF

[76] Inventor: Harold D. Nunn, Jr., 324 W. Cleveland, Pratt, Kans. 67124

[22] Filed: June 28, 1973

[21] Appl. No.: 374,689

Related U.S. Application Data

[63] Continuation of Ser. No. 27,092, April 9, 1970, abandoned.

[52] U.S. Cl.............. 180/79.2 R; 60/403; 60/405; 188/356
[51] Int. Cl............................................ B62d 5/06
[58] Field of Search ........ 180/79.2, 103; 60/6, 403, 60/405, 525; 188/106 P, 356, 357

[56] References Cited
UNITED STATES PATENTS

| | | | |
|---|---|---|---|
| 2,844,003 | 7/1958 | Ingres | 188/357 |
| 3,463,261 | 8/1969 | Runkle et al. | 180/79.2 R |
| 3,528,522 | 9/1970 | Turke | 180/103 |

*Primary Examiner*—Trygve M. Blix
*Assistant Examiner*—Charles E. Frankfort
*Attorney, Agent, or Firm*—Robert E. Breidenthal

[57] ABSTRACT

In an automobile having a hydraulically powered steering system and inclusive of an engine driven hydraulic pump, and vacuum boosted brake system controlled respectively by a steering wheel and a brake pedal, the provision of an electric motor connected to drive the hydraulic pump and a vacuum pump for energizing the steering and brake systems, with a unidirectional drive being interposed between the engine and the hydraulic pump. Energization of the electric motor is caused to occur whenever a force is exerted on either the steering wheel or the brake pedal that is substantially in excess of that normally required to effect steering or braking.

2 Claims, 13 Drawing Figures

INVENTOR.
HAROLD D. NUNN JR.

BY Robert C. Breidenthal

INVENTOR.
HAROLD D. NUNN JR.
BY
Robert E. Breidenthal

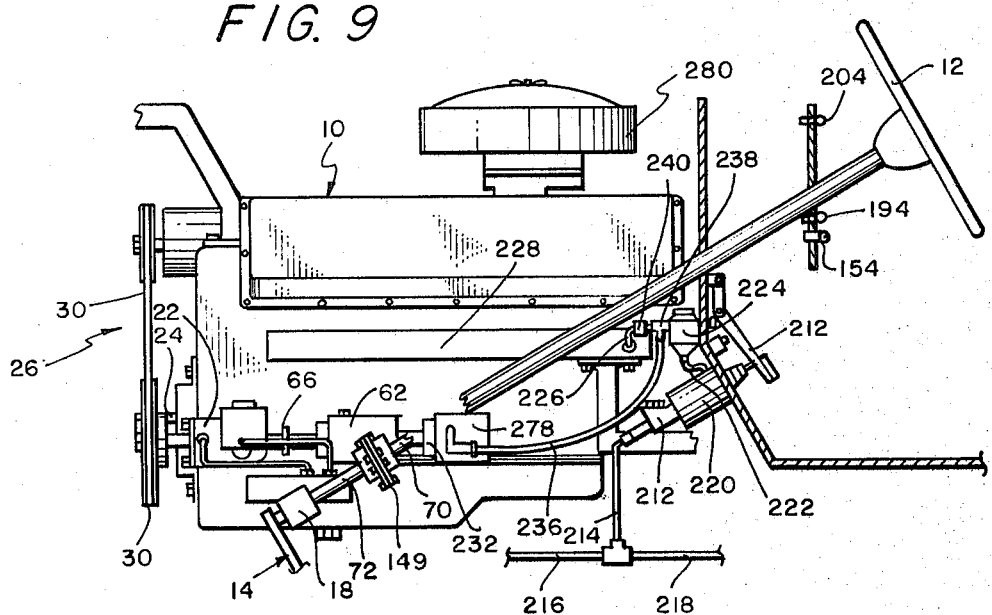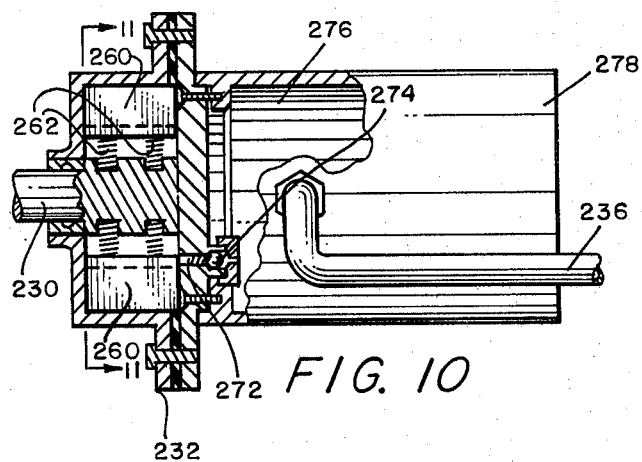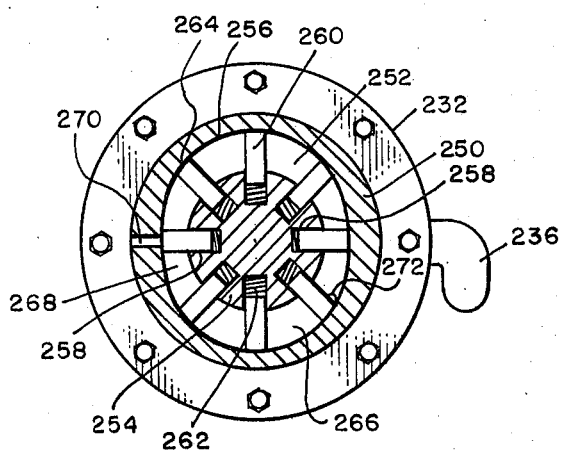

HYDRAULIC POWER BRAKE SYSTEM INCORPORATING AUXILIARY MEANS FOR DRIVING THE PUMP THEREOF

This is a continuation of application Ser. No. 27,092, filed Apr. 9, 1970, now abandoned.

The present invention relates to new and useful improvements in conventional power steering and power brake systems of automobiles, and more particularly pertains to sustaining the operation of such systems when they would otherwise fail to operate by reason of the engine not functioning to drive the hydraulic pump of the power steering system or by reason of the engine not functioning by way of its intake manifold pressure as a source of subatmospheric pressure for the conventional vacuum booster type power brake systems.

A very large number of automobiles recently and currently manufactured incorporate as standard or optional equipment apparatus for the purpose of reducing the amount of manual or physical effort on the part of the driver in the steering of and in the braking of the automobile. Conventional power steering systems are of hydraulically power character and include a hydraulic pump that is driven by the engine, usually by way of a belt and pulley arrangement drivingly connecting an output shaft of the engine to the input or drive shaft of the hydraulic pump.

While steering can be effected by the driver when the power steering system malfunctions, such steering is much more difficult and far greater physical effort and far greater forces must be applied by the driver to the steering wheel in order to obtain desired steering effects than are or in most cases can be applied to the steering wheel when the power steering system is functioning properly.

A conventional power steering system can fail to function properly for many reasons, such as a rupture in the hydraulic lines, a malfunctioning pump, or the servo valving means controlling the hydraulic motor, etc.; however, the most common cause of failure of the conventional power steering system is that the hydraulic pump is not being driven, with such drive to the hydraulic pump being occasioned by the engine of the automobile not operating or the belt and pulley drive connection from the engine to the hydraulic pump malfunctioning. In this connection it should be pointed out that it is quite possible with many types of power trains and transmissions coupling the engine to the automobile's drive wheels for an engine to stall while the automobile is in motion. It is unfortunately true that power steering can fail when its proper functioning is needed the most as the stalling of the engine can cause the driver to be confronted by an emergency situation, or an existing emergency situation can indirectly cause engine stalling, such as, for example, when the driver is prompted by emergency conditions to open the engine throttle of a cool engine too quickly and thereby cause the engine to stall.

It is the paramount object of the present invention to provide an auxiliary means for driving the hydraulic pump in lieu of the engine drive thereof, and which auxiliary means can drive the hydraulic pump even when the engine is stalled and drivingly connected to the hydraulic pump.

It is also an object of the invention in accordance with the preceding object to make the initiation of the operation of the auxiliary means automatic in response to a sensing of failure of the power steering means.

A very common form of power brake systems includes a vacuum booster means in the operation of which is dependent upon the intake manifold of the engine presenting a subatmospheric pressure thereto. Although such power brake systems may incorporate an energy storage device such as a subatmospheric pressure accumulator, the duration of the effectiveness of such energy storage device is limited, and a failure of the intake manifold to present a subatmospheric pressure to the vacuum booster is soon followed by failure of the power brake system with it then being necessary for the driver to exert much greater physical effort and to apply a much greater force to the brake pedal to obtain a desired braking effect. Stalling of the engine will obviously result in the pressure in the intake manifold rapidly rising to atmospheric pressure.

It is another primary aim of the invention to provide an auxiliary means for presenting a subatmospheric pressure to the vacuum booster that will be automatic in initiation of its operation upon failure of the power brake system.

Since engine stoppage or stalling will result in failure of both the power steering and power brake systems, it is an object of the invention to concurrently drive the hydraulic pump and present a subatmospheric pressure to the vacuum booster upon sensing a failure of either of the power systems.

A broad aspect of the present invention involves in an automobile power steering system of the type that includes the prime mover of the automobile being drivingly connected to a hydraulic pump, the combination therewith of an electric motor, means drivingly connecting the electric motor to the pump, and wherein the means for drivingly connecting the prime mover of the automobile to the pump is unidirectional.

Another broad aspect of the present invention involves in an automobile having a control system of the type including fluid pressure actuated means for augmenting a force applied to a controlled member from a manually operable control element, and including an internal combustion engine that is operatively connected to the fluid pressure actuated means to supply actuating fluid pressure to the latter during engine operation; the combination therewith of auxiliary means including an electric motor operatively connected to said fluid pressure actuated means for supplying actuating fluid pressure to the latter during operation of the electric motor, said electric motor being normally deenergized and inoperative, and means responsive to a manual force applied to the control element exceeding a predetermined amount for initiating and sustaining energization and operation of said electric motor, whereby the supply of actuating fluid pressure is sustained upon cessation of engine operation.

Other objects and aspects of the invention as well as important features and advantages thereof will become manifest during the ensuing description of preferred embodiments of the invention, such description being made in conjunction with the accompanying drawings illustrative of such embodiments, wherein:

FIG. 9 is a view similar to FIG. 1 and additionally showing an improved power brake system;

FIG. 10 is an enlarged side elevational view partially in section of the vacuum pump included in the power brake system shown in FIG. 9;

FIG. 11 is a sectional view taken upon the plane of the section line 11—11 in FIG. 10;

FIG. 12 is an enlarged side elevational view of the brake pedal and its actuating relationship to the electric brake pedal switch, the brake pedal being shown in dashed outline in the position occupied by the same when closing the electric brake pedal switch; and, FIG. 13 is a schematic diagram showing the electric circuitry of the apparatus shown in FIG. 9.

Figure 1:
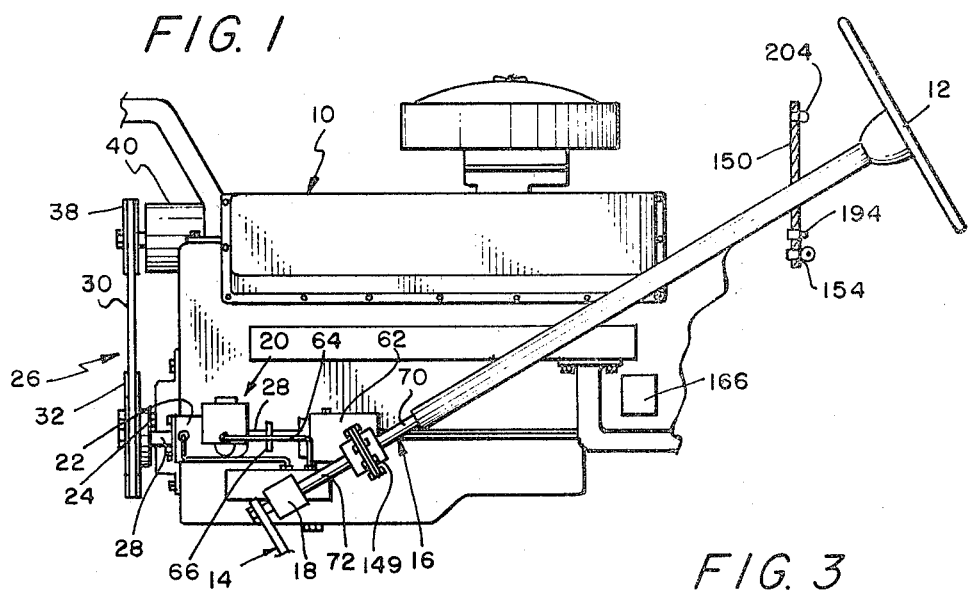
FIG. 1 is a fragmentary side elevational view of an automobile engine and the automobile steering control apparatus provided with the improved power steering system of the invention.

Referring now to the drawings wherein like numerals designate like parts throughout the various views, the reference numeral 10 designates generally the prime mover of a conventional automobile (only partially shown). Such automobile includes a power steering system that departs from well known and conventional power steering systems only to the extent hereinafter pointed out in detail as a departure from the conventional.

The conventional power steering system is well known, and consequently a full and complete understanding of the principles and operation of the invention can be obtained upon stressing in the drawings and the ensuing description the departures from that which is conventional without elaborating upon the conventional aspects of the apparatus. Obviously, either detailed illustration of or detailed descriptions of the conventional aspects of the power steering system would serve no useful purpose and only tend to obscure the present invention.

The power steering system comprises a steering wheel 12, which is operatively connected to conventional steering linkage actuating means, partially shown at 14, of the dirigible front wheels of the automobile, not shown; such operative connection of the steering wheel 12 to the linkage actuating means 14 being by way of a steering shaft designated generally at 16 and a conventional hydraulically powered steering unit well known in the art designated at 18. The steering column 16 departs from the conventional in a manner subsequently described.

Conventional means 20 is provided for supplying hydraulic fluid under pressure to the hydraulically powered steering unit 18, such means including a hydraulic pump 22 for circulating pressurized hydraulic fluid to the unit 20.

The engine 10 includes an output shaft 24 and drive means 26 drivingly connects the engine shaft 24 to the drive shaft 28 of the hydraulic pump 22. The drive means 26, as will be explained presently, departs from the conventional in that such drive means is unidirectional, that is, the drive shaft 28 must rotate if the engine shaft 24 rotates above a predetermined velocity, with the shafts 24 and 28 being decoupled if the shaft 24 is not rotating.

The drive means 26 comprises an endless drive belt 30 entrained over a pulley 32 fixed to the engine shaft 24 and a pulley 34 of a specially provided drive coupling means 36. The belt 30 can be entrained, if desired, over the drive pulley 38 of auxiliary equipment such as for example an air conditioner compressor 40. The essential relationship is that the shaft 24 drives the pulley 34 to rotate through the belt 30. The drive coupling means 26 comprises the pulley 34 being mounted for free rotation on the pump shaft 28, preferably with the provision of antifriction means such as the roller bearings 42.

Figure 6:
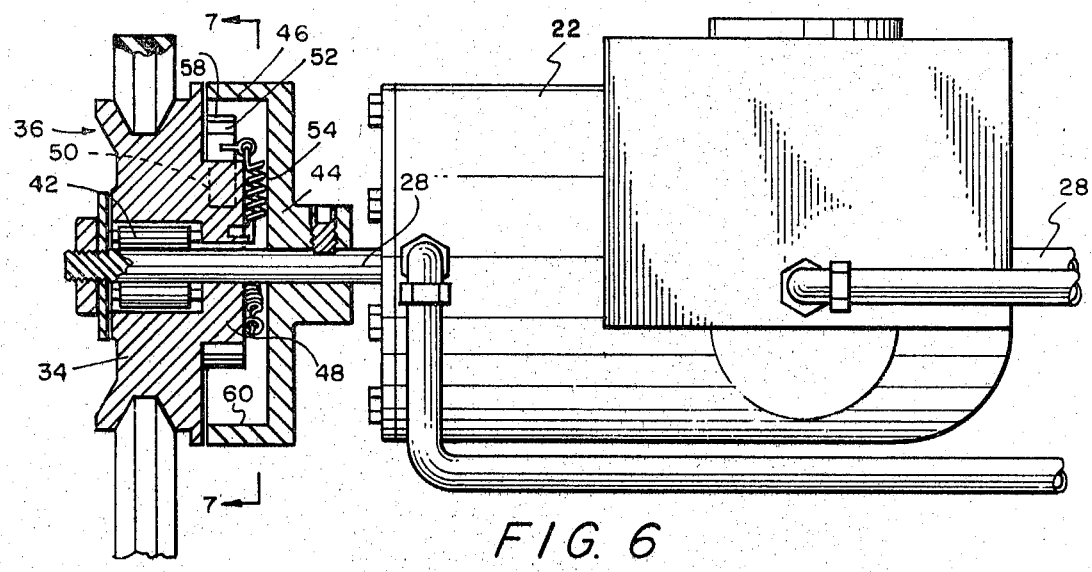
FIG. 6 is an enlarged side view of the hydraulic pump and the unidirectional drive means therefor, with the latter being shown in section.
Figure 7:
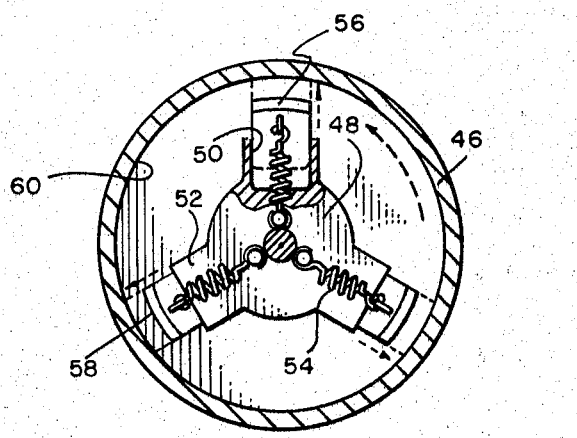
FIG. 7 is a sectional view taken upon the plane of the sectional line 7—7 in FIG. 6.
Figure 8:
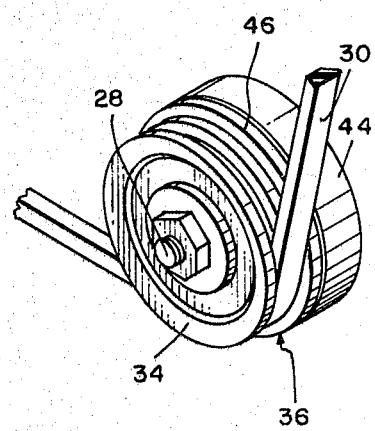
FIG. 8 is an isometric view of the drive means shown in FIGS. 6 and 7.

A clutch member 44 is fixed to the pump shaft 28 for rotation therewith, such clutch member having an integral annular flange 46 axially extending toward the pulley 34 to surround in radially spaced relation an integral hub portion 48 of the pulley 34. The hub portion 48 has three radially outward opening recesses 50 therein circumferentially equally spaced about the axis of the pump shaft. A clutch element 52 is received in and is radially slidable in each of the recesses 50, with each of such elements 52 being yieldingly urged radially inwardly by a tension spring means 54 connecting the clutch element 52 to the hub 48 as shown best in FIGS. 6 and 7. The radially outward ends of each of the clutch elements 52 are enlarged to constitute a clutch shoe portion 56 frictionally engageable with the flange 46 when moved radially outward in its guide recess 50. If desired or deemed expedient, the radially outward surface 58 of the clutch shoe and/or the internal surface 60 of the flange can be surfaced with a conventional material such as commonly used in clutches or on brake shoes to enhance the coefficient of friction.

The operation of the drive coupling means will be readily understood. Rotation of the pulley 34 causes outward movement of the clutch elements 52 against the action of the spring means 54. At a predetermined minimum rotational velocity of the pulley 34, the clutch elements 52 frictionally engage the flange 46, and results in the pulley 34 frictionally driving the clutch member 44. The frictional drive becomes increasingly positive as the rotational velocity of the pulley 34 increases. The spring means 54 is preferably of such stiffness that the frictional coupling will occur at a rotational velocity of the pulley 34 less than that which corresponds to idling of the engine. The coupling means 36 functions in a manner quite similar to and indeed a conventional overriding clutch can be employed in lieu thereof.

The shaft 28 of the hydraulic pump 22 is extended from the rear of the pump 22, whereby the pump 22 can be driven by the portion of the shaft 28 forwardly thereof as thus far described, or from the portion of the shaft 28 rearwardly thereof as will now be described.

An electric motor 62 is provided and the same is suitably mounted to place its output shaft 64 in alignment with the rear end of the pump shaft 28. While the shafts 28 and 64 can be directly coupled, it is preferred that they be coupled by conventional overrunning clutch or unidirectional drive coupling 66 in such an arrangement that when the shaft 28 is driven by the engine 10, the shaft 64 can be stationary, but the shaft 28 will be caused to rotate at least as fast as the shaft 64. It will be understood that the engine 10 and the electric motor 62 both serve to drive the pump 22 in only one direction.

The electric motor 62 is normally deenergized, and means is provided to initiate and sustain energization thereof in response to transmission of a torque from the steering wheel 12 to the hydraulic unit 18 through the steering shaft 16 in excess of a predetermined amount. For this purpose the steering shaft 16 departs from the conventional in that the same is comprised of two aligned sections 70 and 72 respectively connected to the steering wheel 12 and the hydraulic unit 18.

The adjacent ends of the shafts 70 and 72 have respectively fixed thereto flanged coupling discs 74 and 76. The discs 74 and 76 are yieldingly retained in at least close axial proximity to each other by means permitting a limited degree of relative rotation, such means comprising the disc 76 having a pair of diametrically opposed arcuate slots 78 and 80, and a pair of axially extending pins 82 and 84 fixed to the disc 74 and extending respectively through the slots 78 and 80. Coiled compression springs 86 are disposed on the pins 82 and 84 and seated between the disc 76 and nuts 88 threaded on the outer extremities of the pins 82 and 84.

Figure 2:
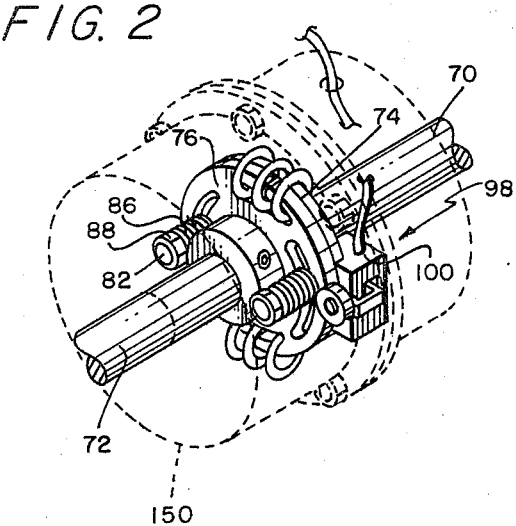
FIG. 2 is an enlarged fragmentary isometric view of the steering column incorporating the torque actuated electric steering switch, with the housing thereof being shown in dashed outline.
Figure 3:
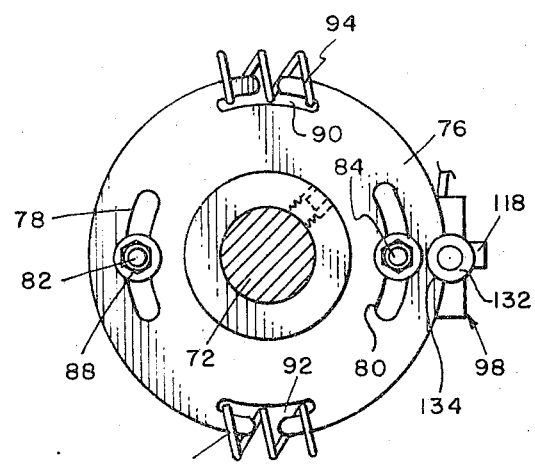
FIG. 3 is an enlarged transverse sectional view of the structure shown in FIG. 2, and showing the steering switch actuating means in its neutral or normal position.
Figure 4:
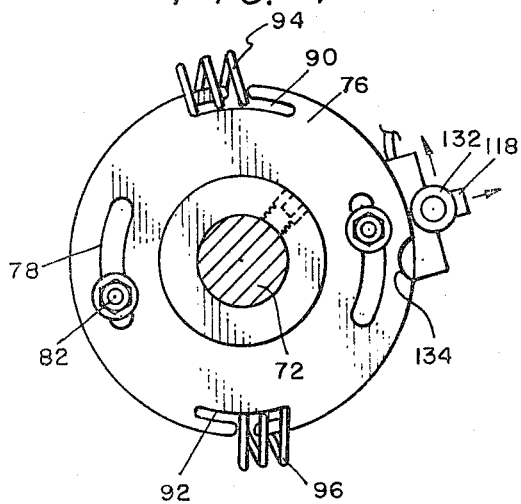
FIG. 4 is a view similar to FIG. 3, however, this view shows the relationship of the parts when the steering switch actuating means is angularly displaced from its neutral position.

Normally the relative angular positions of the discs 74 and 76 are such that the pins 82 and 84 are disposed midway in the circumferential extent of their respective slots 78 and 80 as shown in FIG. 3. Means is provided for yieldingly urging the discs 74 and 76 into their neutral relative angular position. Such means comprises the discs 74 and 76 being provided with diametrically opposed "T" shaped slots 90 and 92 that are in registry when the discs 74 and 76 are in their neutral position. Coiled compression springs 94 and 96 are disposed in the "T" slotted discs 74 and 76 as shown in an arrangement such that the springs 94 and 96 yieldingly oppose any change in the relative angular positions of the discs 74 and 76 as will be evident on inspection of FIGS. 2, 3 and 4. The springs 94 and 96 are quite stiff and are preferably under substantial compressive bias when the discs 74 and 76 are in the neutral relative position shown in FIGS. 2 and 3, whereby the disc 74 must apply a substantial torque to the disc 76 through the springs before a significant relative angular movement of the discs 74 and 76 can occur. FIG. 4 illustrates the relative position of the discs 74 and 76 occasioned by the application of a large clockwise torque to the steering wheel 12.

Figure 5:
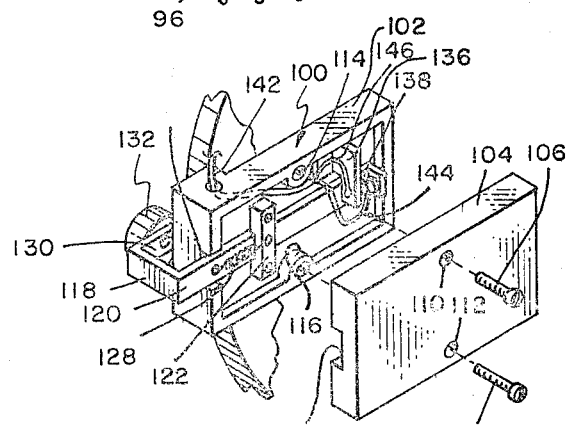
FIG. 5 is an exploded and fragmentary isometric view of the steering switch.

An electric steering switch is indicated generally at 98, such switch 98 having a housing 100 suitably fixed to the disc 74. The switch housing 100 is of two parts 102 and 104 that are secured by fastening screws 106 and 108 that extend through openings 110 and 112 in the housing part 10 and are threaded into threaded recesses 114 and 116 in the housing part 102 as shown in FIG. 5. A "U" shaped actuator 118 has a relatively long leg 120 slidably extending into the switch housing 100 and is guided in reciprocating movement into and out of the housing 100 by a guide element 122 fixed in the housing and by slot defining notches 124 and 126 in mating edges of the housing parts 102 and 104. A coiled tension spring 128 connects the leg 120 and the guide element 122 to yieldingly retract the leg 120 into the housing.

The switch 98 is oriented so that the movement of the leg 120 is radial relative to the axis of the disc 74, and the other leg 130 of the actuator 118 is disposed to extend radially inward toward the axis of the disc 76, and the radially inward end of the leg 130 is provided with a roller 132 rotatably mounted thereon for rolling engagement with the periphery of the disc 76. The spring 128 serves to maintain the roller 132 in contact with the disc 176.

The disc 76 is peripherally notched or recessed at 134 (as best shown in FIG. 4), and the notch 134 is in registry with the roller 132 when the discs 74 and 76 are in their relatively neutral positions. Accordingly, when the discs 74 and 76 are in their relatively neutral position, the leg 120 is in its most fully retracted position in the switch housing 100, and the leg 120 is caused to be extended from the housing 100 when the relative angular position of the discs 74 and 76 depart in either direction from their neutral position.

A contact support 136 of electrically insulative material is mounted within the housing 100. An electric switch contact 138 is mounted on the support 136 in opposition to a switch contact 140 mounted on the inner end of the leg 130. The contact 140 is electrically insulated from the leg 130 by conventional means, not shown. When the discs 74 and 76 are in their relatively neutral position as shown in FIGS. 2 and 3, the leg 130 is in the position shown in FIG. 5, however, when the relative angular position is such as shown in FIG. 4, the leg 130 is extended to place the contact 140 in electrical engagement with the contact 138 so as to close the switch 98. A two conductor electric cable 142 extends into the housing, and one insulated electric lead 144 thereof is electrically connected to the contact 140 with the other insulated lead 146 electrically connected to the fixed contact 138.

While not essential, the torque sensing switch assembly shown in FIGS. 2, 3 and 4 is preferably enclosed in a two-piece housing 149 fixed in any suitable manner to one of the shafts 74 and 76 with the other of such shafts rotatably extending therethrough.

The automobile includes an instrument panel 152 upon which is mounted a conventional key operated ignition switch 154 which has a battery terminal 156 connected to one terminal of the automobile's storage battery 158 by a lead 160 (see FIG. 13), with the other terminal of the battery being grounded to the automobile chassis as indicated at 162. The ignition switch 154 includes the customary ignition terminal 164 connected to the ignition system of the engine 10 by means not shown. A relay 166 is provided which includes a pair of normally open switches 168 and 170 that are closed during energization of the solenoid 172 of the relay 166.

The switches 168 and 170 respectively have pairs of terminals 174 and 176, and 178 and 180, and the solenoid has a pair of terminals 182 and 184. The solenoid terminal 184 is grounded to the automobile chassis as indicated at 186.

The leads 144 and 146 of the electric steering switch are connected respectively to the ignition terminal 164 and the solenoid terminal, the arrangement being such that the solenoid is energized upon the concurrent closure of the ignition switch 154 and the steering switch 98.

Means is provided to sustain energization of solenoid 172 once initiated provided the ignition switch 154 is closed, such means comprising the terminal 176 of the switch 168 being connected to the solenoid terminal 182 by a lead 190, and the terminal 174 being connected to the ignition terminal 164 by a lead 192. Inasmuch as the relay switch 168 is electrically parallel to the steering switch 98, the switch 98 does not have to remain closed to keep the solenoid energized.

While the solenoid 172 is deenergized by opening the ignition switch 154 so as to open the relay switch 168, a normally closed push button switch 194 mounted on the instrument panel 150 is interposed in the lead 190 so as to interrupt energization of the solenoid 172 dependent upon closure of the switch 168.

The switch terminal 173 is connected to the ungrounded battery terminal by means of a lead 196, and the electric motor 62 is connected between the switch terminal 180 and automobile chassis ground by leads 198 and 200, whereby the electric motor is energized whenever the solenoid 172 is energized to close the switch 170.

Figure 13:
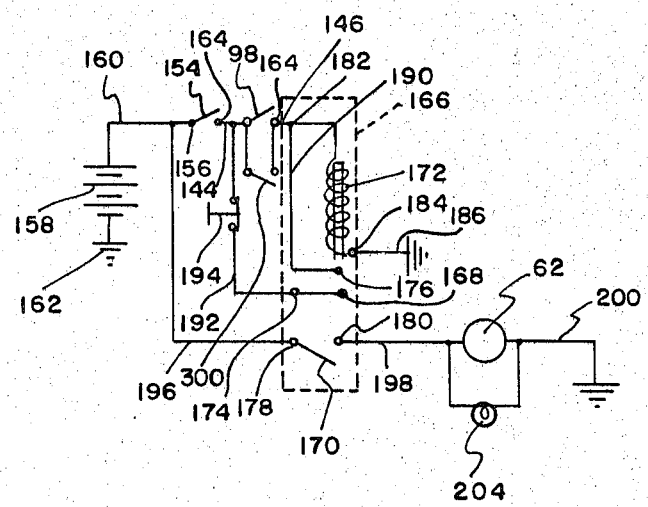

So that the automobile driver may be apprised of or reminded of the fact that the electric motor 62 is in operation to drive the hydraulic pump 22, an electric indicator lamp 204 is mounted on the instrument panel 150 and is connected in electrical parallel with the motor 62 as shown in FIG. 13.

The operation of the apparatus thus far described will be readily understood. As long as the conventional aspects of the power steering system are operating normally, the torque producing forces applied to the steering wheel 12 by the driver are relatively small and are insufficient to cause sufficient relative angular movement of the discs 74 and 76 to close the steering switch 98; however, should the driver be required to apply relatively great torque producing forces to the steering wheel 12, an angular relative movement of the discs 74 and 76 will be caused to occur with resultant closure of the steering switch 98. Closure of the switch 98, even momentarily when the ignition switch 154 is closed, will result in energization of the motor 62 and the indicator lamp 204 until both the switches 98 and 194 are open or until the ignition switch 154 is opened.

Energization of the motor 62 will drive the hydraulic pump 22 and this will restore operation of the power steering system in the event the failure necessitating the application of strong steering forces was the result of the pump 22 not being driven by the engine 22.

The auxiliary electric drive for the pump 22 provided as illustrated and described will serve to quickly restore power steering when lost as a result of stalling of the engine 10, breaking of the belt 30, etc.

Attention is now directed to the embodiment of the invention shown in FIGS. 9 through 12. This embodiment of the invention incorporates all of the previously described subject matter, and additionally includes provision for obtaining a greater degree of reliability for conventional power brake systems.

Bearing in mind that not only are conventional power steering systems dependent upon operation of the engine so are at least some types of power brake systems, specifically the type wherein the subatmospheric pressure in the intake manifold of a piston-type internal combustion engine. Accordingly, it can in many instances be correctly anticipated that such failure of the power steering system as to cause energization of the motor 62 will be accompanied by loss of subatmospheric engine intake manifold pressure. Hence the additional subject matter shown in FIGS. 9 through 12 is concerned with substituting another source of subatmospheric pressure for that of the intake manifold when the motor 62 is energized.

The conventional power brake system includes a brake pedal 210 operatively connected by conventional means, not shown, to a conventional hydraulic piston means 212 for producing necessary hydraulic fluid braking pressures in hydraulic brake pressure distribution lines 214, 216 and 218 that are conventionally connected to the customary hydraulic wheel brakes, not shown. The conventional power brake system includes a vacuum actuated brake booster means 220 for augmenting the fluid pressure that would otherwise be produced in the pressure distributing lines 214, 216, and 218. Such vacuum booster means 220 is connected by a duct 222 to a pressure accumulator or reservoir 224 which is in turn connected by a duct 226 to the intake manifold 228 of the engine 10.

The shaft 62 of the electric motor 62 extends rearwardly from the motor 62 and is coupled to the drive shaft 230 of a vacuum pump 232. The intake or suction port of the pump 232 communicates with a duct 236, which is coupled to the duct 226 at 238. A unidirectional check valve 240 is disposed in the duct 226 intermediate the intake manifold 228 and the connection 238 such that air flow from the intake manifold 228 toward the connection 238 is prevented.

The vacuum pump 232 comprises a housing 250 defining a chamber therein 252. A hub 254 is rotatable in the chamber 252 and is driven by the shaft 230. The pump 232 is of the vane type and the internal surface 256 of the housing 250 is generally of an elliptical transverse configuration as shown in FIG. 11. The hub 254 is provided with a plurality of circumferentially spaced radial slots 258 extending axially along the hub 254. Rectangular vanes 260 are disposed with radially slidable fit in the slots 258, with compression springs 262 disposed in the slots 258 urging the vanes radially outward to maintain the radially outward edges 264 of the vanes 260 in sliding or wiping contact with the internal housing surface 256. Variable volume spaces are defined in the chamber 252 intermediate adjacent pairs of the hub 254 as viewed in FIG. 11 will result in such spaces undergoing expansion in the region of the chamber 252 indicated at 266, and compression in the region indicated at 268. Accordingly, a relatively low pressure is produced in the chamber region 266 and a relatively high pressure is produced in the chamber region 268.

The housing 250 is provided with a discharge port 270 adjacent the chamber region or zone 268 for discharging pressurized air, and the housing 250 has an inlet port 272 communicating with the low pressure region or zone 266. The intake port 272 is provided with a ball check valve means 274 whereby air is prevented from exiting from the chamber 252 through the port 272.

While the check valve 274 can be directly connected to the duct 236, it is preferred that the port 272 and the check valve 274 be connected to a pressure reservoir 276 to which the duct 236 is connected. The reservoir 276 is preferably formed of a housing 278 fixed to the pump housing 250 as shown.

As thus far described the operation of the auxiliary vacuum means will be readily understood. Failure of the power steering system as evidenced by the occurrence of an excessive torque in the steering shaft 16 will result in not only the electric motor 62 driving the hydraulic pump 22 but also the motor driving the vacuum pump 232. Operation of the vacuum pump 232 presents a subatmospheric pressure to the vacuum booster means 220 to assure operation of the latter. The check valve 240 prevents loss of or relief of the suction pressure produced by the pump 232 through the engine air cleaner 280 and carburetion system.

The initiation of operation of the motor 62 can be caused upon failure of the power brake system as evidenced by the necessity of the driver to apply a substantially greater force upon the brake pedal 212 than would be the case when the power brake system is functioning properly. This mode of initiation of operation of the motor is obtained by providing a normally open electric switch means in parallel with the steering switch 98 that will close upon the application of a force upon the brake pedal 212 substantially greater than is normally applied even in drastic braking situations when the power brake system is operating properly. Such means conveniently takes the form of the brake pedal 212 being formed of two sections 290 and 292 that are hingedly connected at 294. The free end section 292 is yieldingly urged by a stiff tension spring 296 counterclockwise as viewed in the drawings toward the full line position shown thereof in FIG. 12. A stop 298 is fixed to the brake pedal section 290 to limit the movement of the section 292 counterclockwise from its illustrated full line position in FIG. 12. A normally open microswitch 300 is fixedly mounted adjacent the brake pedal section 292 in the clockwise travel path of the latter about its pivots 294 and 302. The swinging movement of the brake pedal 212 about the pivot 302 is insufficient for engagement of the section 292 with the microswitch 300 to close the latter in the absence of movement of the section 292 about the pivot 294. However, the application of an extraordinarily great force against the lower end 304 of the section 292 will cause sufficient pivotal movement about the pivot 302 and also about the pivot 294 against the action of the spring 296 to cause the section 292 to engage and actuate the brake pedal or microswitch closed 300.

Since the brake pedal switch 300 is in parallel with the steering switch 98, closure of the former, as in the case of the latter, will cause initiation energization of the electric motor.

It will be noted that failure of either the power steering or the power brake systems resulting from engine stalling can be initially sensed by closure of either of the switches 98 or 300 and both systems thereupon made fully operative.

Attention is now directed to the appended claims.

I claim:

1. In an automobile having a control system of the type including a vacuum actuated brake booster means for augmenting a force applied to a controlled member from a brake pedal, and including an internal combustion engine that is operatively connected to the booster means to supply a vacuum pressure to the latter during engine operation; the combination therewith of auxiliary means including an electric motor operatively connected to said booster means for supplying a vacuum pressure to the latter during operation of the electric motor, said electric motor being normally deenergized and inoperative, means responsive to a manual force applied to the control element exceeding a predetermined amount for initiating and sustaining energization and operation of said electric motor, whereby the supply of vacuum pressure is sustained upon cessation of engine operation, said engine being of the reciprocating piston type and having an intake manifold, said operative connection of the engine to the booster means comprising a duct connected between the intake manifold and the brake booster means for fluid pressure communication therebetween, said auxiliary means including a vacuum pump operatively connected to the electric motor and having its intake connected to said duct, said duct being provided with a unidirectional valve between its connections to the intake manifold and the vacuum pump for preventing fluid flow in the duct from the intake manifold to the vacuum pump, said means for initiating and sustaining operation of the electric motor comprising an electric relay means that includes a solenoid and first and second normally open electric relay switches that are closed during energization of the solenoid, a source of electrical energy, said electric motor being connected to said source of electrical energy in electrical series with the first electric relay switch, a normally open electric brake pedal switch together with means for closing such electric brake pedal switch in response to a manual force applied to the brake pedal in excess of a predetermined amount, said second electric relay switch and said electric brake pedal switch being in electrical parallel, and said solenoid being connected to said source of electrical energy in electrical series with the electrically paralleled second relay electric switch and the electric brake pedal switch, said automobile being provided with a power steering system of the type that includes a hydraulic pump, unidirection drive means connecting the engine to drive the hydraulic pump, and unidirectional drive means drivingly connecting the electric motor to the hydraulic pump, whereby both the vacuum pump and the hydraulic pump are concurrently driven by the electric motor, and wherein the steering system includes a manually operated steering wheel coupled to a steering shaft, a normally open electric steering switch, means responsive to the application of a manual force upon the steering wheel effective to produce a torque in the steering shaft in excess of a predetermined value for closing said electric steering switch, and said electric steering switch being in electrical parallel with the electric brake pedal switch, whereby said solenoid is energized upon closure of either the electric brake pedal or electric steering switches.

2. In an automobile having a control system of the type including a hydraulic pump and fluid pressure actuated means for augmenting a force applied to a controlled member from a steering wheel, and including an internal combustion engine that is operatively connected to the hydraulic pump by a unidirectional drive means to supply actuating fluid pressure to the fluid pressure actuated means during engine operation; the combination therewith of auxiliary means including an electric motor operatively connected to said hydraulic pump by a unidirectional drive means for supplying actuating fluid pressure to the fluid pressure actuated means during operation of the electric motor, said electric motor being normally deenergized and inoperative, and means responsive to a manual force applied to the steering wheel exceeding a predetermined amount for initiating and sustaining energization and operation of said electric motor, whereby the supply of acutating fluid pressure may be sustained upon cessation of engine operation, said means of initiating and sustaining operation of the electric motor comprising an electric relay switch means that includes a solenoid and first and second normally open electric relay switches that are closed during energization of the solenoid, a source of electrical energy, said electric motor being connected to said source of electrical energy in electrical series with the first electric relay switch, a normally open electric steering switch together with means for closing such electric steering switch in response to a manual force applied to the steering wheel in excess of a predetermined amount, said second electric relay switch and said electric steering switch being in electrical parallel, said solenoid being connected to said source of electrical energy in electrical series with the electrically paralleled second relay electric switch and the electric steering switch, an electrical indicator lamp connected in electrical parallel with said electric motor, means for interrupting energization of the solenoid through the second electric relay switch, said automobile including a brake system actuated by a vacuum booster means, and a vacuum pump connected to the vacuum booster means, with said electric motor being drivingly connected to the vacuum pump.

* * * * *